United States Patent [19]

Nagatomo

[11] Patent Number: 4,981,106

[45] Date of Patent: Jan. 1, 1991

[54] AUTOMATIC PET FEEDER

[75] Inventor: Osamu Nagatomo, JETRO Apt. 1-401, 1-39-25, Kamiooka Higashi, Konan-ku, Yokohama, Kanagawa-Pref. 233, Japan

[73] Assignee: Osamu Nagatomo, Yokohama, Japan

[21] Appl. No.: 366,672

[22] Filed: Jun. 15, 1989

[30] Foreign Application Priority Data

Dec. 1, 1988 [JP] Japan ................. 63-302258

[51] Int. Cl.⁵ .............................. A01K 5/02
[52] U.S. Cl. ................... 119/51.11; 222/650
[58] Field of Search ............ 119/51.01, 51.11, 51.13, 119/51.14, 51.15; 222/650, 355, 354, 168.5

[56] References Cited

U.S. PATENT DOCUMENTS

| | | | |
|---|---|---|---|
| 3,605,697 | 9/1971 | Szekely | 119/51.11 |
| 3,658,036 | 4/1972 | Caracappa | 119/51.13 |
| 3,741,162 | 6/1973 | Lopez | 119/51.13 |
| 3,762,373 | 10/1973 | Grossman | 119/51.11 |
| 3,946,702 | 3/1976 | Mazzini | 119/51.13 |
| 3,955,537 | 5/1976 | Yujiri | 119/51.13 |
| 4,000,719 | 1/1977 | Richards | 119/51.13 |
| 4,485,765 | 12/1984 | Schwartz et al. | 119/51.13 |

FOREIGN PATENT DOCUMENTS

| | | |
|---|---|---|
| 21147081 | 4/1961 | Fed. Rep. of Germany ... 119/51.11 |
| 2814186 | 10/1979 | Fed. Rep. of Germany ... 119/51.13 |
| 55-34080 | 3/1980 | Japan . |
| 55-37141 | 3/1980 | Japan . |
| 55-37142 | 3/1980 | Japan . |
| 55-54831 | 4/1980 | Japan . |
| 58-56625 | 4/1983 | Japan . |
| 59-66822 | 4/1984 | Japan . |
| 59-95831 | 6/1984 | Japan . |
| 61-152222 | 7/1986 | Japan . |

*Primary Examiner*—Gene Mancene
*Assistant Examiner*—R. Thomas Price
*Attorney, Agent, or Firm*—Poms, Smith, Lande & Rose

[57] ABSTRACT

An automatic pet feeder is shown, havin a flat cylinder-like feeding tray and a timer, which is a 24-hour clock. The clock has many slits at the contour of the face to stick the pins in for transferring the turning motion of the clock to the feeding tray. The feeding tray has a wheel-like carrousel inside the case, which is sectioned with separators into small feed boxes, with as many juts sticking out in even length to the center of the circle for receiving the turning motion of the clock which is placed inside the case on the floor. The feed boxes have flaps to drop the feed from the carrousel when the feed box passes over an opening which is made on the floor of the casing.

11 Claims, 4 Drawing Sheets

AUTOMATIC PET FEEDER

FIELD OF THE INVENTION

The present invention relates to pet feeders, and, more particularly, to automatic pet feeders.

BACKGROUND OF THE INVENTION

Most of the automatic pet feeders of past inventions were on a large scale assuming cats and dogs for their beneficiaries. Timers or sensors were used to trigger the switch to activate a driving block of motors on and off to drive the feeding mechanism. (See, for example, the following Japanese patent publications: Nos. 55-34080, 55-54831, 55-37141, 55-37142, 58-56625, 59-66822, 59-95831, 61-152222.)

The driving block requires not only the motor but also gears, pulleys, belts, brakes, etc. Subsequently, the cost increases as does the number of the elements, and the system demands the mechanism to become large and complicated. For this reason, the automatic pet feeders in the past have not been widely used in the ordinary household.

In the case of small pets like fish and unlike the other kinds of pets, the difficulty of moving the water tank made it hard to leave them in the hands of the others. During a keepers' long absence, there may be such inconveniences as having to arrange for neighbors or friends to come to the actual site and feed the small pet.

Also, pet keepers who keep busy schedules during the day, or who work on an irregular shift cannot bother their family or friends and feeding became very irregular. Moreover, individuals who want to start a hobby of keeping small pets, such as fish, are discouraged to do so, due to such hassles and inconveniences.

This invention tries to solve such problems and offers a low-cost automatic pet feeder which can be easily handled in the ordinary household.

SUMMARY OF THE INVENTION

In principle, the mechanism uses an irregular gear motion. In other words, the feed boxes on a carrousel have protruding juts to receive a turning thrust from pins on the turning clock display. The clock is positioned for the clock pins to function as a gear to make contact only when a pin nears a feed-box jut. In this way, an on-and-off effect is produced by the transfer of the turning motion of the clock to the carrousel for only a certain period of time.

DESCRIPTION OF THE PREFERRED EMBODIMENTS

Figure 1:
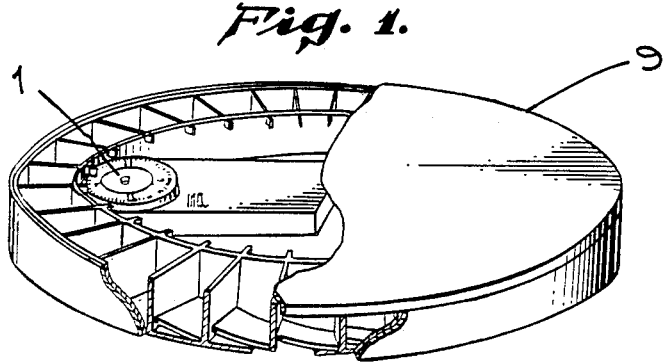
FIG. 1 is a perspective view of the automatic pet feeder showing the invention as a whole.
Figure 2:
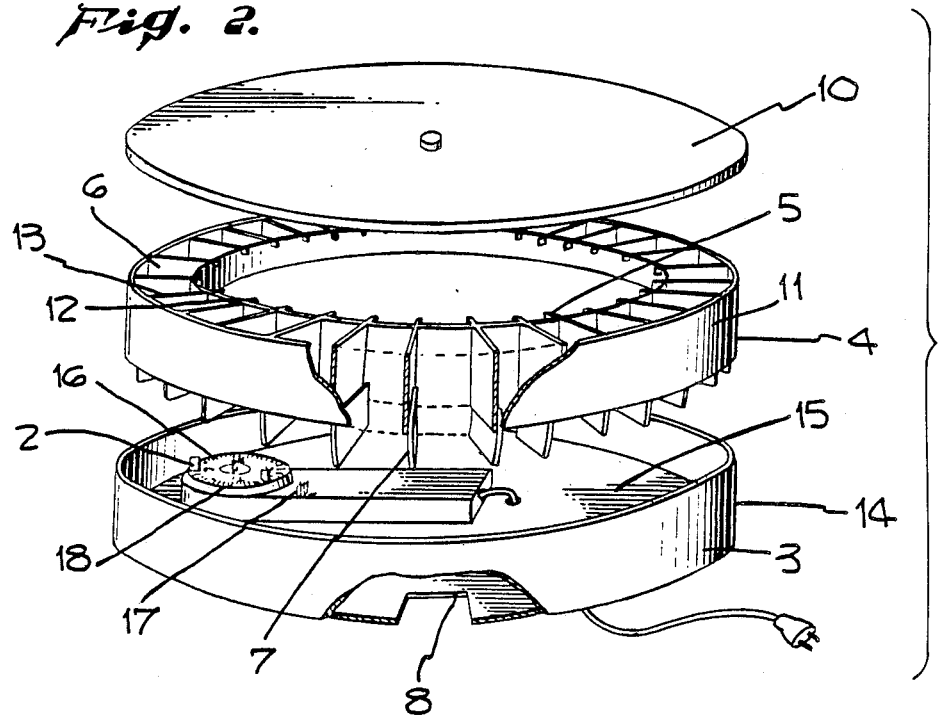
FIG. 2 is a perspective exploded view of the feeder, with a portion cut out to show the details.

Referring now to FIGS. 1 and 2, the automatic pet feeder consists of two parts; a clock 1 which functions as a timer and a source of movement and a flat cylinder-shaped feeding tray 9.

The clock 1 is a mechanical and analog clock, not an electric and digital one, for it is to be used for its turning movement. The procurement of the turning movement may be either by electricity or hand-winding, but the more torque produced the better for the turning activation. In order to get the feeding mechanism to work at any time of the day, a 24-hour clock, not a 12-hour clock, is desired. The reason for this is that if a 12-hour clock is set, for example, to work on 7 o'clock, it is activated at both 7 o'clock in the morning and the evening. A 12-hour clock could not work at 7 o'clock in the morning and 5 o'clock in the evening or only at 4 o'clock in the afternoon. In the preferred embodiment, the clock face 16 turns. Thus, the time is shown not by a pair of clock hands but by inscriptions on the turning display on the clock face itself which takes the form of a disc.

The second part of the feeder is a feeding tray 9 consisting of a carrousel 4, a flat cylinder-shaped casing 3 which houses the carrousel, and a top lid 10.

The carrousel 4 is a container composed of an outer wall 11 and an inner wall 12 made parallel about the same center point. Walls 11 and 12 are sectioned with separators 13 positioned along projection lines in even angles from the center point. The resultant small even-spaced boxes 6 are for the feed allocation. Feeding once a day for a month would require 30 boxes in the carrousel. But, the carrousel 4 can be divided into many boxes as desired as long as the division allows for an appropriate overlapping area detailed below. At the bottom of each feed-box is situated a flap 7. Further, at each feed-box 6 is rigged an even-length jut 5 extending from the inner wall 12 toward the center of the carrousel.

The casing 3 is a combination of a flat cylindrical outer cover 14 that surrounds the outer wall 11 of the carrousel and a round, flat bottom 15 with a feed-drop opening 8 therein. On top of the pet feeder is placed a lid 10 to protect the feed from drying, absorbing moisture, or attracting insects.

The casing 3 not only protects the carrousel 4, it also serves as a guide to give the carrousel 4 a smooth turning motion. For this reason, low-turning friction between carrousel 9 and case 3 is desirable. An inner cover extending from lid 10 alongside the inner wall of the carrousel 4 is optional. Such a cover should not interfere with the turning movement of the feed-box juts 5. The carrousel 9 may be easily taken out of the casing 3.

At the display face of the clock 16 is an inscription of time and at the outer contour a number of small slits 18 to reach pins 17. When a pin is inserted, it stands out as a clock pin 2 on the face of the clock. By inserting a pin 17 in different slits 18, the feeding time is changed. There is a limit to the number of the slits to be had in a small area, three or four slits in an hour's time space is maximum. Thus, the interval between the slits is limited to 15 or 20 minutes.

Figure 3:
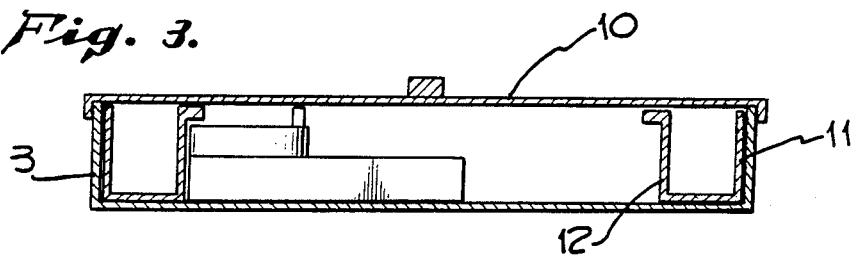
FIG. 3 is a cross-sectional view of the feeder placed horizontally.
Figure 4:
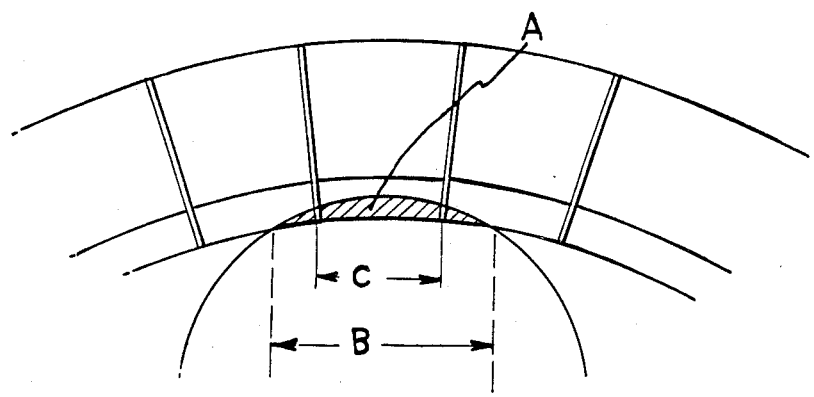
FIG. 4 is a conceptual view of an overlapping area between a clock face and a carrousel.
Figure 5:
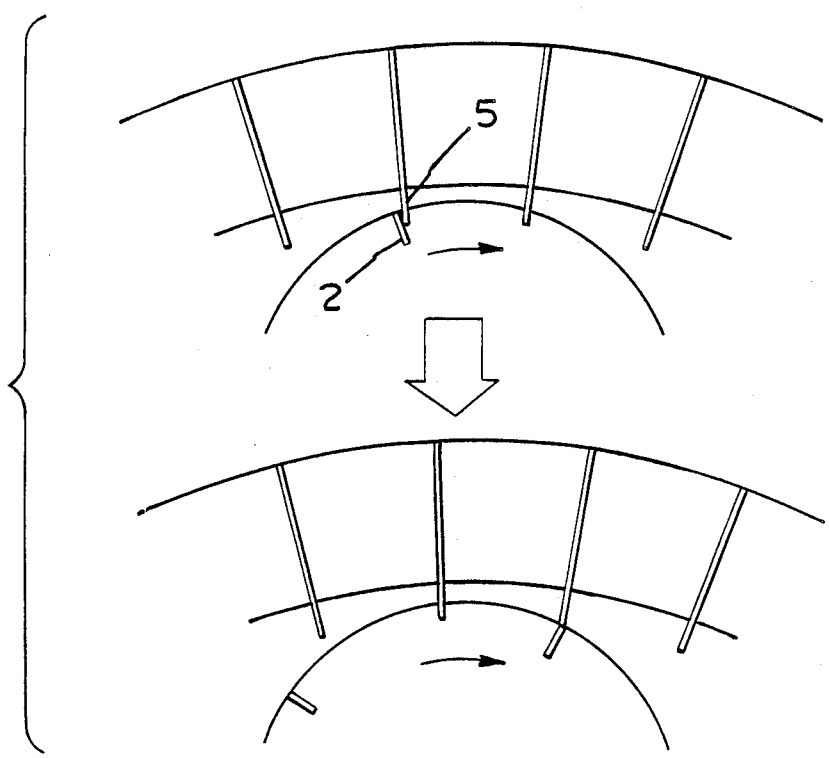
FIG. 5 is a conceptual view of a contact between a clock display pin and a feed-box jut and their departures.

The clock 1 must be fastened to the floor 15 of the casing 3. In determining the appropriate position, the diameter of the clock face 16 should be smaller than that of the carrousel 4. The trajectory of the tip of the clock pin 2 should not touch the inner wall 12 of the carrousel 4 but instead touch from inside upon part of the circling trajectory that the feed-box jut 5 draws. If it is so followed, as indicated in FIGS. 3 and 4, at the cross section of those two trajectories is formed an overlapping area (A). Conditionally, the end-to-end length (B) of the overlapping area should be longer than the opposing length (C) between the adjacent juts of the feed box, but shorter than double that length. If this requirement is followed when a carrousel is first placed inside the casing, the overlapping area (A) inevitably includes one or two feed-box juts.

When the clock pin 2 catches on a feed-box jut 5 at the overlapping area (A), the feed-box jut 5 is pushed by the clock pin 2 and the turning motion of the display is conveyed to the carrousel 4. Gradually the carrousel starts to turn in the casing 3. The clock pin 2 continues to push the feed-box jut. Since the two are not fastened to each other, no trouble is caused in the turn of the clock. After a while, a clock pin 2 passes the deepest part of the overlapping area (A) and, as it leaves the overlapping area (A) in its turn, it loses the contact of the feed-box jut 5 and the carrousel cover in a halt.

In the meantime, by this partial turning motion, the carrousel was moved by the space of one feed box 5, and on following jut 5 is situated at the overlapping area (A). This following jut 5 is subsequently pushed by the next pin 2, or by the same pin after one full turn, when it passes through the overlapping area again. In this way, feed boxes are moved in one direction intermittently by the number of the pins on the clock and number of days.

Administering the overlapping area is quite important. If an overlapping area is not maintained, or if a feed-box jut length falls short of standing in the overlapping area, the clock pins will fail to catch a feed-box jut indefinitely and the carrousel would not budge. Or, if two or more of the feed-box juts are situated in the overlapping area, one pass of a clock pin will cause the two or more feed-box spaces to open at a time.

Figure 6:
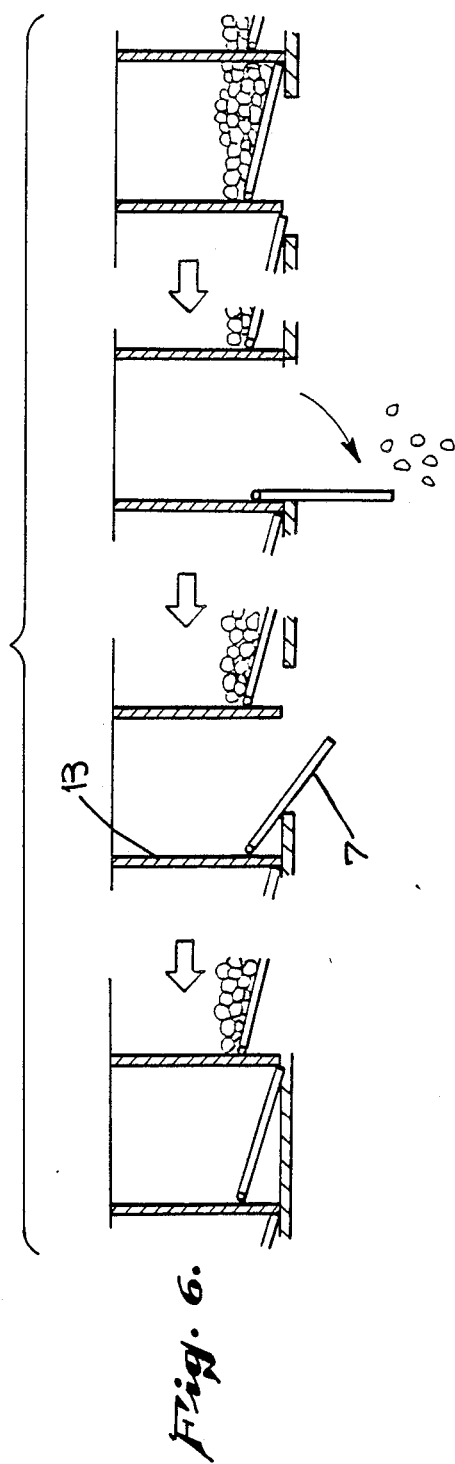
FIG. 6 is a drawing showing a sequence of the flaps being dropped and lifted by the carrousel motion moving from right to left.
Figure 7:
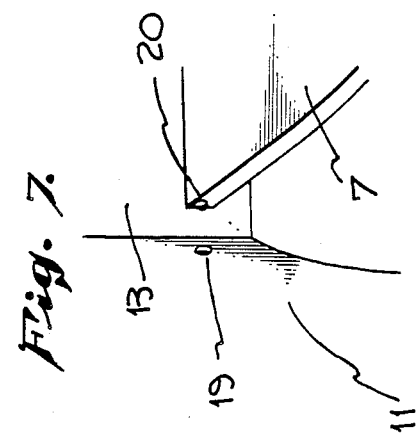
FIG. 7 is a perspective view of a carrousel showing a dent in the carrousel wall and a mound on the flap to provide a pivoting action on the flap.

In each feed box 5, there is a section separator 13, an outer wall 11 and an inner wall 12. The bottom of the box is not closed, but instead a flap 7 is installed. This flap, as is shown in FIGS. 6 and 7, fits into two dents 19 at the bottom part of the outer and inner walls on the progressing side, with mounds 20 at two sides of the flap 7 to engage the dents 19. These dents and mounds serve, when snugly put together, as a pivot for the free movement of the flaps 7. The flaps 7, when set apart from the casing 3, point to the ground with their own weight.

In this case, as is shown in FIGS. 1 and 2, the axle of the pivot of the flap 7 should not be made at the very bottom of the section separators 13, but slightly above the bottom edge. In this way, when the flap is drawn up, as will be described later, it will not interfere with the smooth turning of the carrousel. Therefore, when the carrousel 4 is in the casing 3, a flap 7 serves as a bottom of the box 6 with a slanted angle. By being slanted the feed is concentrated towards one direction, and therefore increases the weight on smaller areas to help the fall of the flap and feed.

In the bottom of the casing 3 is a feed-drop opening 8 just underneath the carrousel equal in size to the size of one feed box 6. When the motion of the clock 1 is conveyed to the carrousel 4, one feed box 6 moves inside the case until it passes over the feed-drop opening 8 in its entirety. As is shown in FIG. 6, the flap 7 which served as a bottom of box 6 loses its support at the moment it passes over the opening. In this instance, the flap opens with the weight of the feed and that of the flap and the allocated feed drops to the ground or into the tank.

The dropped flap 7 is gradually lifted up by the remaining, or the next-coming, turn of the clock 1. Since the carrousel 4 always turns in one direction, the flap does not stand in the way of turning. The returned flap now serves again as the bottom of the feed box which is now empty. The box 6 may be refilled and the action is repeated.

In order to avoid trouble caused by poor turning of the carrousel which may be caused by its heavy weight, the carrousel must be made with a light material; and the clock should have a strong torque. The feed for tropical fish, for example, is usually flakes or pellets whose weight is no hazard.

The automatic pet feeder is used in the following manner. First, whether an electric clock or hand-winding, make sure of the source of energy. Place the feeder so that the carrousel 4 is horizontal. In the beginning, with feed boxes 6 empty and without the clock pins 2 on the clock display, turn the carrousel gently by hand and the flaps 7 will drop down. Next, at one point where a flap is down, stop the carrousel and mark the place where the feed-box jut 5 is positioned in the overlapping area. Set the clock so that the present time is shown at this exact position. If the carrousel and the clock are positioned with the pin slip 18 precisely in the middle of the overlapping area, the middle point then defines the position where the flap drops. The rest of the handling of time-setting becomes easy. Then, insert the pin 17 at the desired time on the clock display 16. Lastly, allocate the feed in each feed box 6 for the desired number of times in the order of feeding and close the lid.

Figure 11:
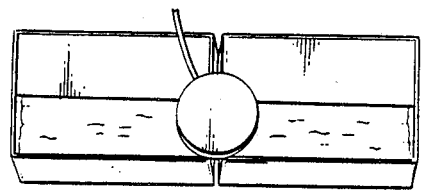
FIG. 11 is a perspective view of an embodiment with the feeder having two feed-drop openings and placed on top of two fish tanks.

One may use the feeder described above by modifying the case 3 to have two feed-drop openings 8 on opposing sides at the floor 15. When the feeder is placed over two tanks as shown in FIG. 11, it then feeds on both sides at the same time. The number of the openings is not limited to two, but can be as many as one wants as long as they are evenly placed. But, the maximum times of feedings are reduced by the number of openings.

Figure 8:
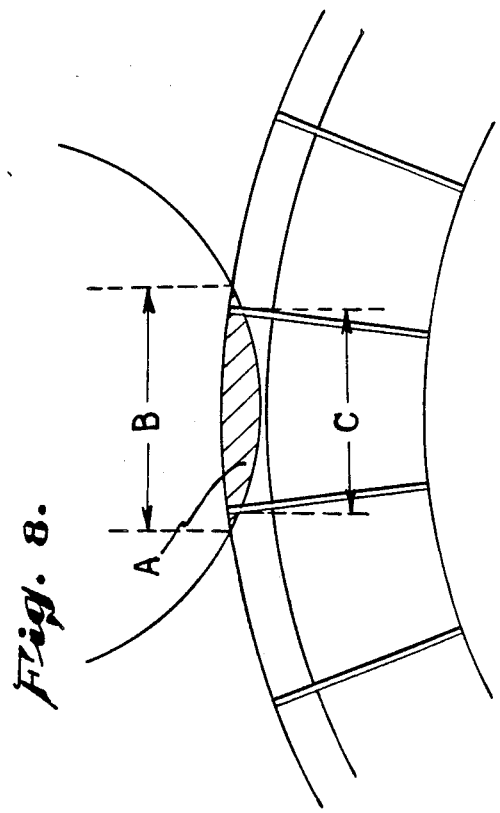
FIG. 8 is a perspective view similar to FIG. 4 with a clock placed outside of the carrousel feeding tray and the feed-box juts installed on the outer face of the carrousel wall.
Figure 9:
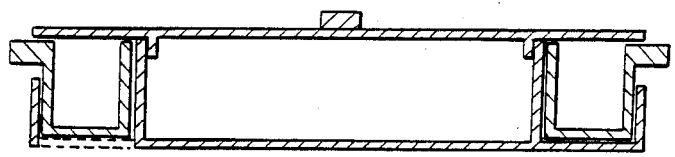
FIG. 9 is a cross-sectional view similar to FIG. 3 of the carrousel when the clock is placed outside the feeding tray.
Figure 10:
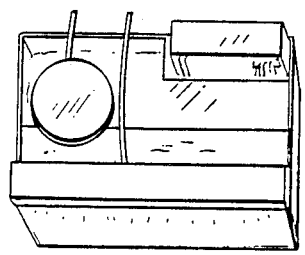
FIG. 10 is a perspective view showing the pet feeder in a preferred embodiment.
Figure 12:
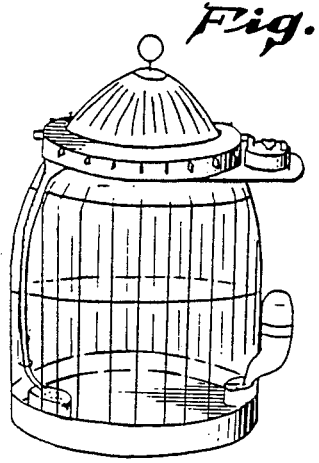
FIGS. 12 and 13 are the perspective views of the feeder in embodiments where a timer is placed outside of the carrousel.
Figure 13:
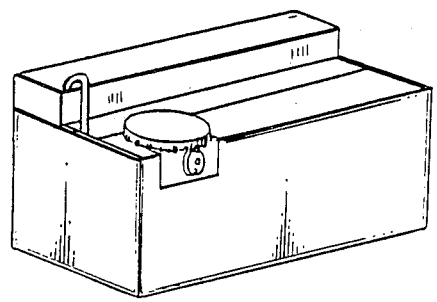

If one wants to make variations in the pet feeder for the purpose of feeding birds or hamsters or wants to reshape the feeder, the clock can be placed outside the feeding tray instead of inside. In this case, as shown in FIG. 12, the feed-box juts 5 are placed at the outside wall of the carrousel 4, as seen in FIG. 9. Also in this case, the two trajectories of the feed-box jut and clock pin must cross as shown in FIG. 8, to abide by the rules of the overlapping area as set forth above. As shown in FIG. 13, the clock and the feeding tray can be placed not only on a flat two-dimensional face but on a three-dimensional face.

In any case, the casing 3 must be so made that the feed-box juts 5 do not touch the outer casing, but smoothly glide inside the casing. Moreover, drinking water must be secured for pets that need drinking water by means of other available gadgets.

This feeder is not only used by itself but can be combined with other devices. For example, the clock, which is used as the timer, can also be used to switch off and on a showing lamp. Here, an automatic pet feeder and automatic showing lamp can be made into one and the fish can be maintained safely and snugly for some days without man's care.

I Claim:

1. An automatic pet feeder, comprising
    a movable disc driven by clock means;
    pins adjustably positioned upon said movable disc,
    a casing for mounting a carrousel;
    said carrousel divided by partitions into feed boxes for storage therein;
    juts extending from said carrousel for engaging said pins and for imparting movement to said carrousel;
    said juts each aligned with said partition that divide said carrousel into said feed boxes;
    each feed box of said carrousel having an opening therein and each said casing having at least one opening therein wherein alignment of said carrousel opening with said casing opening permits the carrousel feed box to be emptied under the timed control of said movable disc and clock means.

2. The automatic pet feeder of claim 1, wherein:
    said movable disc is formed from a face plate display of said clock means.

3. The automatic pet feeder of claim 1, wherein:
    said clock means is a 24-hour clock.

4. The automatic pet feeder of claim 1, wherein:
    said clock means is mounted inside said carrousel in said casing.

5. The automatic pet feeder of claim 4, wherein:
    said clock means and said casing are in a common plane.

6. The automatic pet feeder of claim 1, wherein:
    said clock means is mounted outside said carrousel and said casing.

7. The automatic pet feeder of claim 6, wherien:
    said clock means and said casing are mounted at right angles to one another.

8. The automatic pet feeder of claim 1, additionally comprising:
    flap means for closing said opening in each feed box in said carrousel; and
    said opening in said casing being large enough to permit said flap means to drop therethrough.

9. The automatic pet feeder of claim 1, wherein:
    said opening in said casing includes at least two openings.

10. The automatic pet feeder of claim 1, wherein:
    said pins engage said juts during a part of the time said movable disc is rotated by said clock means.

11. The automatic pet feeder of claim 10, wherein:
    said pins may be adjustably placed upon said disc to adjust the time during which said carrousel is rotated by said clock means.

* * * * *